United States Patent [19]

Etcheverria et al.

[11] 4,208,195

[45] Jun. 17, 1980

[54] DEVICE FOR DISPERSING A RESIDUAL GAS COMPRISING A PLURALITY OF INJECTION NOZZLES

[75] Inventors: Jean-Michel Etcheverria, Biarritz; Flavien Lazarre, Pau; Pierre Poujol, Bizanos, all of France

[73] Assignee: Societe Nationale Elf Aquitaine (Production), Paris, France

[21] Appl. No.: 905,947

[22] Filed: May 15, 1978

[30] Foreign Application Priority Data

May 18, 1977 [FR] France ............................... 77 15416
Nov. 2, 1977 [FR] France ............................... 77 32951

[51] Int. Cl.$^2$ ............................................ B01D 53/00

[52] U.S. Cl. ............................... 55/159; 55/DIG. 14; 239/419.5; 366/11; 366/107

[58] Field of Search ................... 55/17, DIG. 14, 159; 239/419.5, 428; 261/DIG. 75; 366/5, 11, 101, 106, 107

[56] References Cited

U.S. PATENT DOCUMENTS

| | | | |
|---|---|---|---|
| 3,330,486 | 7/1967 | Semple | 239/419.5 X |
| 3,659,962 | 5/1972 | Zink et al. | 239/419.5 X |
| 3,706,534 | 12/1972 | Verheul et al. | 239/428 X |

FOREIGN PATENT DOCUMENTS

| | | | |
|---|---|---|---|
| 2225200 | 11/1974 | France | 55/17 |

*Primary Examiner*—Robert H. Spitzer
*Attorney, Agent, or Firm*—Brisebois & Kruger

[57] ABSTRACT

A device for dispersing in the atmosphere a residual gas, especially a residual gas containing gaseous hydrocarbons, comprises an open ended mixing conduit having two end sections, at least one injection nozzle assembly each of which comprises at least one nozzle opening into an injection zone defined in the vicinity of at least one of the mixing conduit end sections. Each nozzle of each assembly is connected to a conduit which is connected, in turn, to a common source of pressurized residual gas, and the nozzles of the various assemblies are distributed in the injection zone, and constructed in such a manner that the ratio of the square root of the passage section of said mixing conduit to the square root of the sum of the passage sections of said nozzles of the various assemblies is comprised between 35 and 300.

4 Claims, 5 Drawing Figures

DEVICE FOR DISPERSING A RESIDUAL GAS COMPRISING A PLURALITY OF INJECTION NOZZLES

The present invention is related to an improved device for dispersing in the atmosphere a residual gas in the form of a mixture having a controlled composition, and more particularly in the form of a mixture wherein the percentage of the residual gas is lower than the low explosibility limit (LEL).

Devices of this kind have already been described in French Patent specification No. 2,225,200 filed by the Applicant. The known devices are constituted by a substantially cylindrical mixing conduit defining an axis of symmetry and provided with a coaxial injector connected to a pressurized gas source. These devices can be fed under the variable pressure prevailing in a given space or volume to be purged or drained, or under the constant pressure prevailing in an outlet conduit.

French Patent application No. 75/23892 filed by the Applicant discloses means for optimizing the operating conditions of such dispersion devices by interposing in the outlet conduit leading the gas to the injector a control mechanism which feeds the injector with gas at a pressure the value of which lies between a high feeding pressure and the pressure prevailing in the mixing conduit.

With or without optimizing appliances, the use of such dispersing devices rapidly raises space requirement problems when the volume of the gas to be dispersed increases by substantial amounts.

In the various known devices the gas jet builds up freely, in an air environment, in the form of a cone having an apex angle of about 20°. When the periphery of this cone reaches the wall of the mixing conduit the gas flow thin jets undergo a modification of their flow direction so as to flow in a direction parallel to the wall of the mixing conduit while exerting a "piston effect" in a manner similar to that occurring in a gas jet pump.

The amount of gas injected into the mixture depends on the ratio of the passage sections of the injector and the mixing conduit, respectively, for a given injection pressure.

The length of the mixing conduit must be sufficient to allow the periphery of the cone of injected gas to reach the wall of said conduit. Thus, if:

D represents the diameter of the mixing conduit in the form of a cylinder having a circular cross-section, and
$\alpha$ represents the apex angle of the cone,
the minimum length of the conduit is given by the following equation:

$$L_{min} = \frac{D}{2} / \text{tang} \frac{\alpha}{2}$$

and thus, with the provision of a sufficient overdimension:

L' #4 D

Now it has been shown in French Patent specification No. 2,225,200 that with a view to obtaining a gas content N of the issuing mixture when the injection pressure equals P, the ratio of the square roots of the passage sections of the mixing conduit and the injection nozzle, respectively, is determined by an experimental relation justified by considerations related to the mechanics of fluids.

When the values of N and P are given, a minimum value of the passage section of the air injection nozzle as well as a definition of the section and consequently of the lenghth of the mixing conduit correspond to each particular value of the residual gas flow rate.

Since there is, for a given value of the passage section of the mixing conduit, a maximum value of the flow rate of gas which can be dispersed while the percentage of such gas in the effluent is maintained below the LEL, it will be seen that when the flow rate of the gas to be dispersed increases, the minimum passage section of the conduit increases with the flow rate and consequently its length increases with the square root of the flow rate.

The present invention provides a device for dispersing in the atmosphere a residual gas, especially a residual gas containing gaseous hydrocarbons, which device comprises a mixing conduit having two open end sections, at least one injection nozzle assembly, each of which comprises at least one nozzle opening into an injection zone defined in the vicinity of at least one of the end sections of said mixing conduit, each nozzle of each nozzle assembly being connected to a conduit which is connected, in turn, to a common source of the pressurized residual gas, said nozzles of the various nozzle assemblies being distributed in the injection zone, and constructed in such a manner that the ratio of the square root of the passage section of said mixing conduit to the square root of the sum of the passage sections of said nozzles of the various assemblies is comprised between 35 and 300.

In various embodiments of the invention the device further comprises at least one supplementary conduit connected to a source of residual gas under a pressure substantially lower than the pressure of the residual gas injected by said nozzles into said injection zone, the outlet orifice of said supplementary conduit being located in the vicinity of said injection zone. Preferably said lower pressure is a pressure close to atmospheric pressure.

When space requirements do not allow one or more vertical or inclined mixing conduits to be installed—which is the case of many drilling installations or oil production installations at sea—these mixing conduits may be mounted horizontally along the sides of the drilling platforms and oriented in the predominating direction of the wind. However when the direction of the wind is reversed, the operation of a dispersion device of this kind is considerably impeded, which entails a considerable decrease of its efficiency.

The present invention also allows this drawback to be overcome by providing symmetrical dispersing devices able to operate in two mutually opposed flow directions.

This embodiment of the device according to the invention comprises two similar injection installations mounted, respectively, at the two end sections of the mixing conduit and comprising each at least one injection nozzle assembly, the nozzles of said assemblies of said two installations being symmetrically directed towards the inner space of the mixing conduit.

In one embodiment the pressure loss due to the presence of the nozzles and their supporting elements is compensated by providing each one of said end sections of the mixing conduit with a coaxial extension having a conical shape tapering in the direction toward the inner space of said mixing conduit.

In this latter embodiment the efficiency of the device may be improved by mounting the nozzles of each nozzle assembly in such a manner that their outlet orifices are located in front of the respective end section of the mixing conduit.

The invention will be described herein-after in a more detailed manner, especially with reference to the appended drawings which represent by way of example, but not of limitation, several embodiments of the invention.

IN THE DRAWINGS

Figure 1:
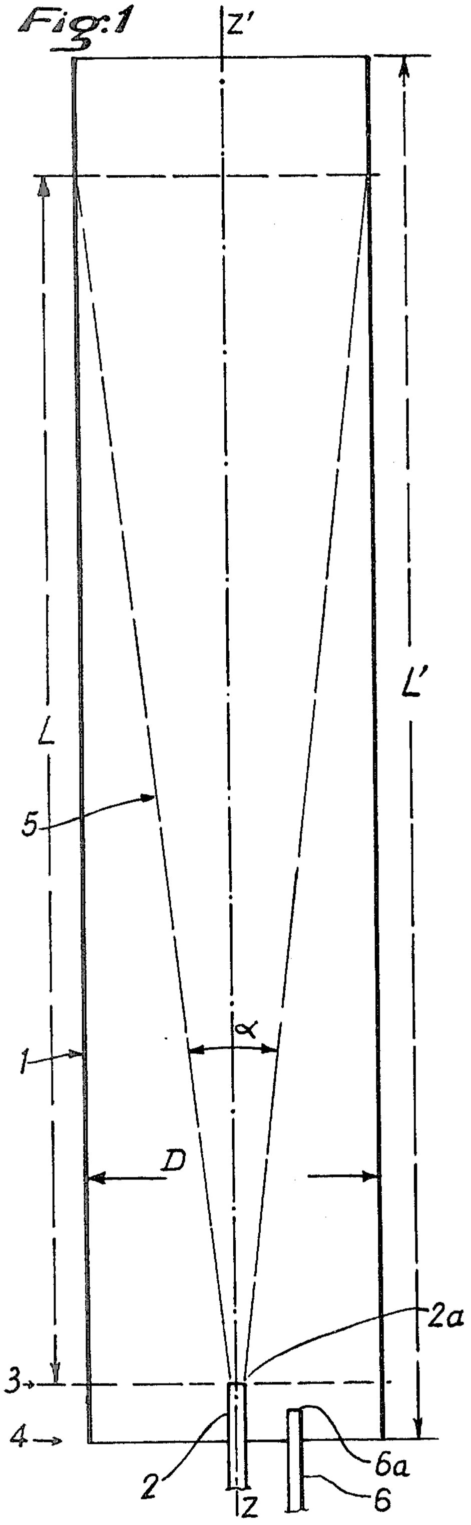
FIG. 1 shows a dispersing device having one single injection nozzle for the pressurized residual gas.

FIG. 1 schematically shows a known dispersing device of the kind disclosed in French Patent specification No. 2,225,200. Such device essentially comprises a mixing conduit 1 having a cylindrical cross-section and two open ends or end sections; this conduit defines an axis of symmetry ZZ'. The device further comprises an injection conduit 2 coaxial to the conduit 1 and terminated by a nozzle 2*a* in a transverse cross-sectional plane 3, or injection plane, which is located in the vicinity of the adjacent end section 4, or inlet section, of mixing conduit 1. Injection conduit 2 connects the nozzle to a source of pressurized gas (not shown in the Figure).

Experience has shown that a pressurized gas injected into a conduit such as conduit 2 flows within a periphery defining a cone of revolution 5 the axis of which coincides with axis ZZ' and the apex angle of which is substantially equal to 20°. At the interface between the gas and the air—which interface is defined by cone 5—substantially no mixing of the gas and the air will occur; on the contrary, in the zone of the line of contact or intersection between the cone 5 and the inner wall of mixing conduit 1, air will be most powerfully aspired and mix, from said zone on, with the gas.

When D designates the diameter of mixing conduit 1 and L designates the length of the flow path portion downstream of which the mixing occurs, the following relation prevails:

L # 3 D

In practice a greater length L' is selected for reasons of security, such as "L' # 4 D"

A conduit 6 with an outlet orifice 6*a* in the vicinity of the zone of injection defined by the orifice of the abovementioned nozzle is connected to a source (not shown) of gas under a pressure substantially lower than that of the source to which the injection nozzle 2*a* is connected.

Figure 2:
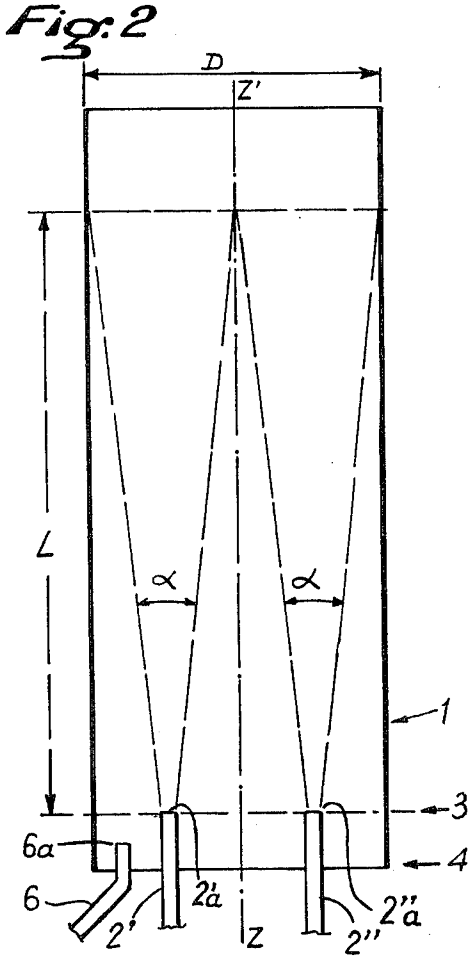
FIG. 2 shows a dispersing device having a plurality of injection nozzles for the pressurized residual gas.

FIG. 2 diagrammatically shows a gas dispersing device which also comprises—as the device of FIG. 1—a mixing conduit 1 having two open ends. In the vicinity of the inlet end 4, or inlet section, two injection nozzles 2'*a*, 2''*a* connected to conduits 2' and 2'', respectively, open into mixing conduit 1, instead of a single injection nozzle 2*a* (as shown in FIG. 1), in the injection plane 3. A conduit 6 opening through an orifice 6*a* adjacent to the injection zone connects orifice 6*a* to a source (not shown) of gas under a pressure substantially lower than that of the source connected to nozzles 2'*a*, 2''*a*.

Figure 3:
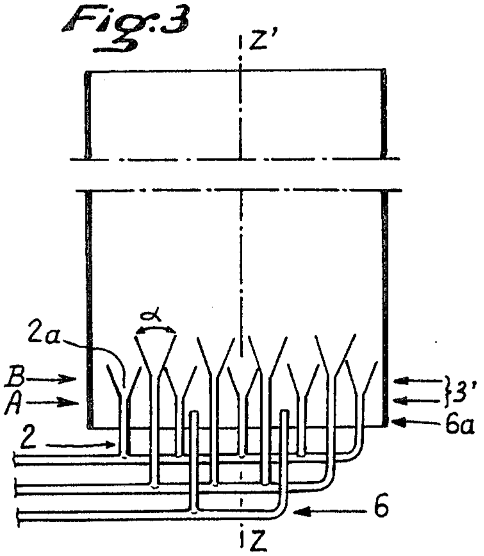
FIG. 3 shows a dispersing device having a plurality of injection nozzles for the pressurized residual gas, grouped so as to form a plurality of injection nozzle assemblies.

FIG. 3 schematically shows a multiple-injector dispersion device comprising two injection nozzle assemblies A and B, wherein the nozzles 2*a* of each assembly are connected by conduits 2 to a common source (not shown) of pressurized gas. The two assemblies A and B may be connected to respective pressurized gas sources under different pressures, or to respective pressurized gas sources under the same pressure.

The nozzle of the two assemblies open into an injection zone 3' defined in the Figure by its extreme limits.

Independently of the injection nozzle 2*a*, the dispersing device comprises a plurality of conduits 6 with outlet orifices 6*a*, which are connected to a source (not shown) of gas under a pressure lower than the lowest pressure of the sources connected to the injection nozzles such as 2*a*.

Such a source of residual gas under a comparatively low pressure may be submitted to a pressure close to atmospheric pressure, or even slightly below atmospheric pressure, while remaining within the limits of the low pressure created in the device at the inlet end of the mixing conduit.

In the embodiment of FIG. 2, it will be seen that the length L downstream of which the air mixes with the injected gas is reduced by one half, as compared to the corresponding length in the conventional device shown in FIG. 1.

In one embodiment of the device according to FIG. 1, the passage section of nozzle 2*a* is so selected relative to the passage section of the mixing conduit 1, that the maximum gas flow rate compatible with the desired conditions of dispersion, as defined by the low explosibility limit (LEL) percentage, is obtained. This leads to adopting a ratio:

$$\frac{\text{square root of the passage section of the mixing conduit}}{\text{square root of the passage section of the injection nozzle}}$$

not lower than 50.

With a view to comply with the same requirements, as regards the conditions of dispersion, it is thus necessary to provide, in the embodiment of FIG. 2, injection nozzles such as 2'*a* and 2''*a* which have dimensions such that the sum of their respective passage sections equals the passage section of nozzle 2*a* in the embodiment of FIG. 1.

The fact of providing a plurality of injection nozzles brings about the advantage of offering the possibility to reduce the length, and thus the space requirements, as well as the weight, of the installation, which is one of the aims of the invention.

Tests have shown that, surprisingly, the fact of providing a plurality of nozzles for the injection of the residual gas to be dispersed results in a considerable improvement of air aspiration and that, under these conditions, it is possible to provide an injection nozzle assembly arranged in such a manner that the sum of their respective passage sections is substantially higher than the value which must not be exceeded in the conventional installations. Thus in a dispersing device having a plurality of injection nozzles the ratio of the square root of the passage section of the cylindrical mixing conduit to the square root of the sum of the respective passage sections of the injection nozzles may be lower than 50; at the limit, this ratio may be as low as 35.

This is particularly advantageous, as regards the elimination of the residual gases under low pressure, especially under a pressure of some tens of millibars above atmospheric pressure. These conditions are encountered in various types of storing tanks for liquid hydrocarbons and in atmospheric separators.

Figure 4:
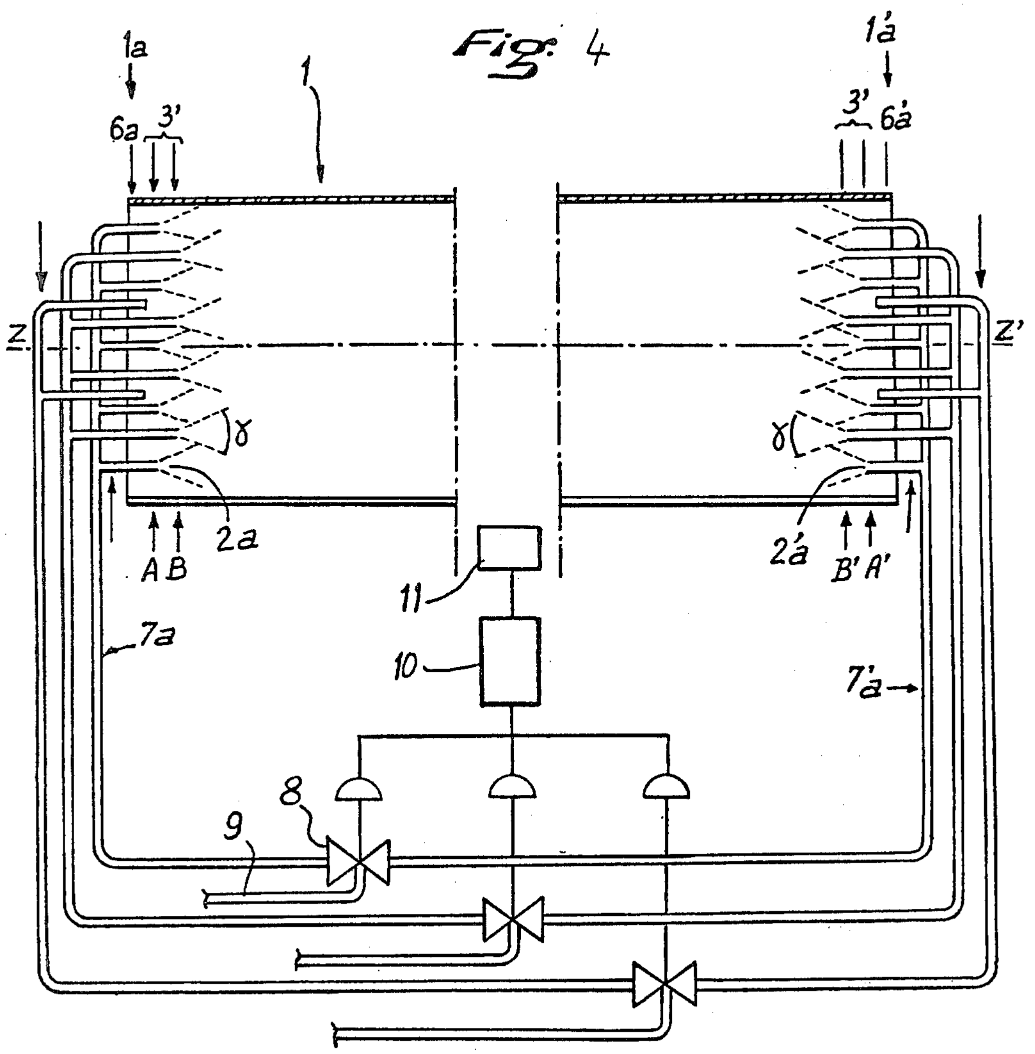
FIG. 4 shows a dispersing device provided with two symmetrically mounted injection installations.

FIG. 4 schematically shows a device for dispersing residual gas, which comprises two symmetrically opposed injection installations.

The gas dispersing device comprises, in this embodiment, a cylindrical mixing conduit 1 having two open end or end sections 1*a* and 1'*a*, and two opposed and symmetrically mounted injection installations located, respectively, at the two ends 1*a* and 1*b*.

FIG. 4 shows by way of example the schema of a device wherein each one of said injection installations comprises two injection nozzle assemblies A, B and A', B'. The nozzles 2*a* of each assembly such as A are connected by a conduit such as 7*a* to a common source (not shown) of pressurized gas. The nozzles 2'*a* of assembly A', symmetrical with respect to assembly A, are correspondingly connected by a conduit 7'*a* to a common source (not shown) of pressurized gas.

Conduits 7*a* and 7'*a* are connected each to said source by respective three-way valves 8 remotely controlled in such a manner that they move from one position wherein they connect conduit 7*a* of assemblies A, B to said source through a conduit 9, to another position wherein said valves 8 connect conduit 7'*a* of assemblies A', B' to said source through said conduit 9.

Each three-way valve 8 is actuated by an actuating device 10 which is remotely controlled by a manual control device, or by a device 11 measuring the direction of the wind.

Assemblies A, B, A', B' are connected, respectively, to different gas sources; however they may also be connected to a single common gas source.

Such a dispersing device; when mounted in a substantially horizontal position, is able to operate, due to the reversing mechanism acting on valves 8, in one direction or in the opposite direction, and especially in that direction which corresponds to the average direction of the prevailing wind.

It is advantageous to associate the remote control means with a time-constant device, so that the reversal of the operating direction is caused only after modifications of the direction of the wind, which present a certain stability.

When the injection of residual gas is effected by means of assemblies A and B, the assemblies A' and B' and the associated conduits cause, on the one hand, a certain pressure drop, or pressure loss, in the gas flow and constitute, on the other hand, a factor enhancing the turbulence which improves the conditions of mixing of the gas with the air.

Figure 5:
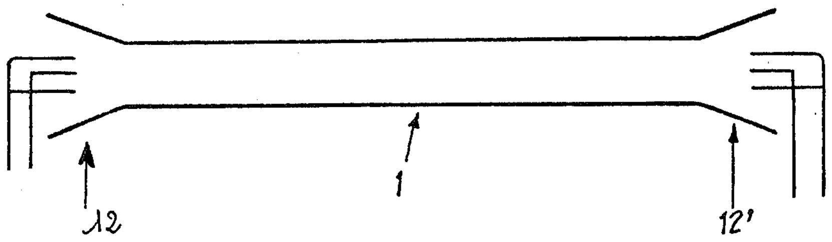
FIG. 5 is a simplified diagram of a device similar to that of FIG. 4, but further provided with frustoconical extensions located at the respective end sections of the mixing conduit.

According to a particular feature of the invention, it is possible to extend the mixing conduit at its two ends, or end sections, by respective frusto-conical conduit portions 12 and 12', as shown in FIG. 5, having a appropriate apex angle and tapering toward the inner space of mixing conduit 1.

This structure enables to reduce, or even to compensate entirely the pressure losses caused by the presence of the injection installations.

In the embodiment shown in FIG. 5 the injection nozzles 2*a* and 2'*a* open respectively in front of the inlet and outlet end sections of the mixing conduit proper.

The invention is not limited to the embodiments shown and described herein; many modifications can be envisaged by those skilled in the art without departing from the spirit and scope of the invention as defined in the appended claims.

What is claimed is:

1. A device for dispersing in the atmosphere a residual gas, especially a residual gas containing gaseous hydrocarbons, comprising:

a mixing conduit having two open end sections, each end section of the mixing conduit being provided with an injection installation comprising at least one injection nozzle assembly, each nozzle assembly comprising at least one nozzle opening into an injection zone defined in the vicinity of each one of the end sections of said mixing conduit, each nozzle of each nozzle assembly being connected to a conduit which is connected, in turn, to a common source of pressurized residual gas, said nozzles of the various nozzle assemblies being distributed in the injection zone, and constructed in such a manner that the ratio of the square root of the passage section of said mixing conduit to the square root of the sum of the passage sections of said nozzles of the various assemblies is comprised between 35 and 300.

2. The device of claim 1, wherein each one of the end sections of said mixing conduit is extended by a coaxial frusto-conical conduit portion tapering toward the inner space of said mixing conduit.

3. The device of claim 1, wherein each one of said end sections of the mixing conduit is extended by a coaxial frust-conical conduit portion tapering toward the inner space of said mixing conduit, and wherein each nozzle of each injection assembly is mounted in such a manner that their outlet orifices are located in front of the corresponding end section of the mixing conduit.

4. The device of claim 1 wherein each nozzle assembly comprises a plurality of nozzles.

* * * * *